No. 733,252. Patented July 7, 1903.

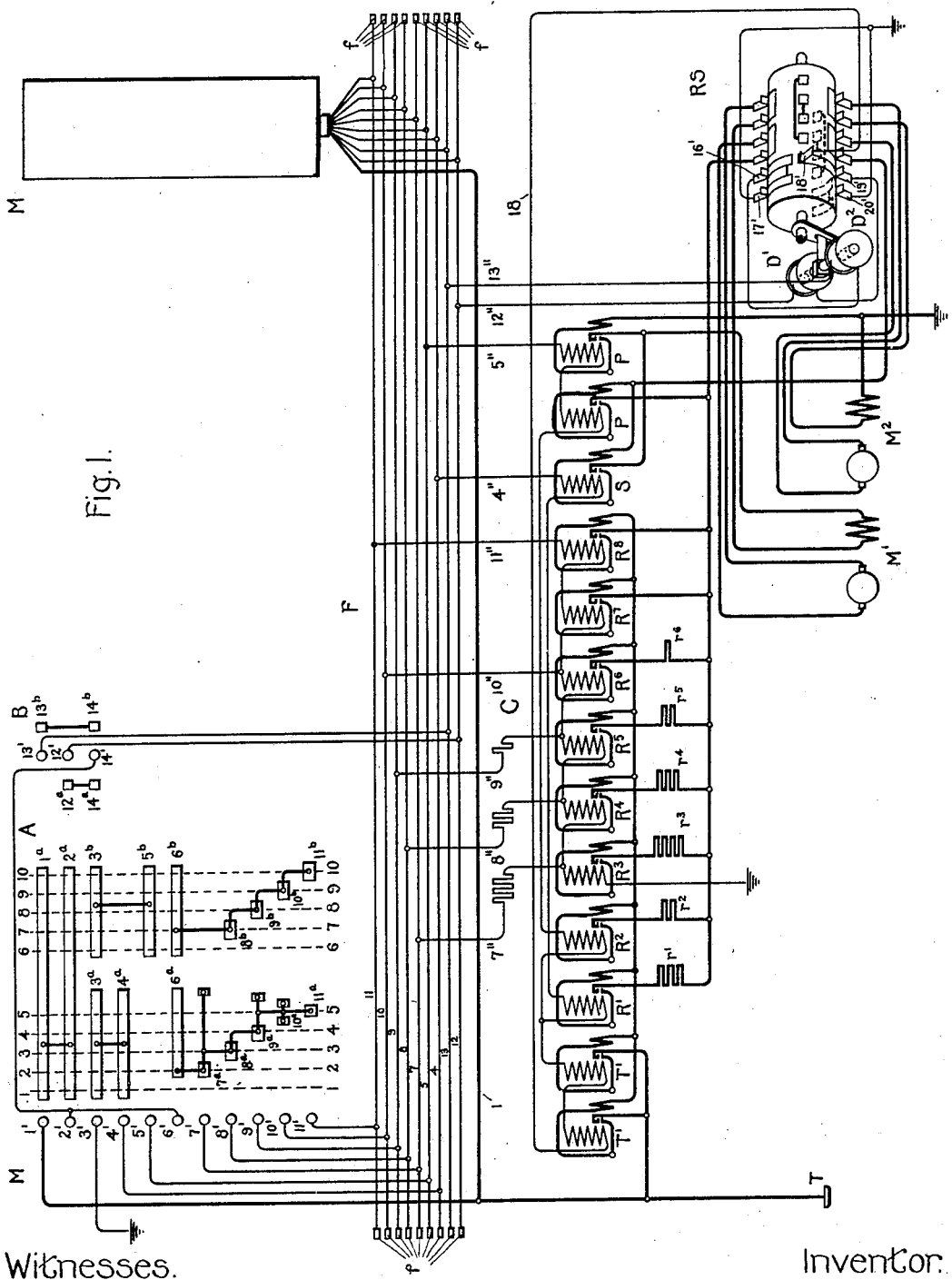

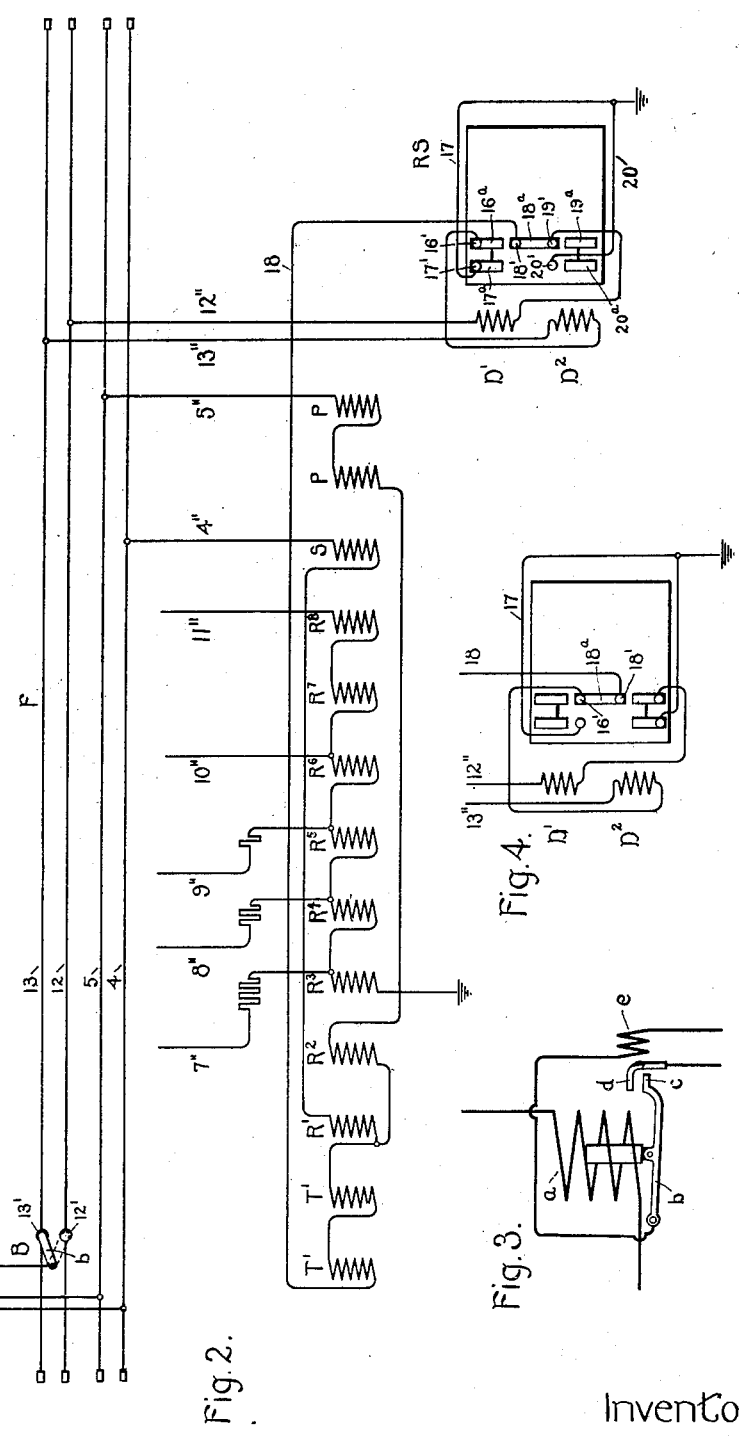

UNITED STATES PATENT OFFICE.

WILLIAM O. MUNDY, OF SCHENECTADY, NEW YORK, ASSIGNOR TO GENERAL ELECTRIC COMPANY, A CORPORATION OF NEW YORK.

MOTOR-CONTROL SYSTEM.

SPECIFICATION forming part of Letters Patent No. 733,252, dated July 7, 1903.

Application filed January 2, 1902. Serial No. 88,069. (No model.)

*To all whom it may concern:*

Be it known that I, WILLIAM O. MUNDY, a citizen of the United States, residing at Schenectady, county of Schenectady, State of New York, have invented certain new and useful Improvements in Motor-Control Systems, of which the following is a specification.

My invention relates to systems for controlling the operation of an electric motor or motors from a distant point. Such systems are now extensively employed in the operation of electric-railway trains. In general they comprise motor-controllers on one or more cars of the train, each motor-controller comprising two sets of contacts, one set for controlling the circuit connections and the other set for controlling the direction of rotation of the motors, master-controllers located at any desired points throughout the train, and an operating system connecting the controller-actuating means to the several master-controllers, so that all the motor-controllers on the train may be operated from any one of the master-controllers.

The particular type of system to which my present invention relates is one in which the operating system is electrical in its character.

In one of its aspects my invention consists of an improved system for controlling the operation of the reversing and circuit-controlling switches in a system of the character above described in which the circuit connections are so arranged that the operation of the circuit-controlling switches in all operative positions of the master-controller will be dependent upon the proper operation of the reversing-switch.

In another of its aspects my invention consists in such an arrangement of the operating-circuits of a motor-control system that a current of large volume may be supplied to the reversing-switch-actuating windings to operate the said switch and the value of said current reduced after the switch has been operated without introducing merely dead resistance into the circuit of the actuating-winding.

Systems of the same general character as the one disclosed in the present application are to be found in patent to Thomson, No. 617,546, granted January 10, 1899, and in the application of Frank E. Case, Serial No. 671,994, filed February 28, 1898, and the general arrangement of the control-circuits illustrated herein is disclosed in patent to C. L. Perry, No. 687,060, granted November 19, 1901.

Referring to the drawings annexed to this specification, Figure 1 is a diagram of a motor-control system embodying the improvements constituting my present invention, the system being shown in a form adapted for application to one of the motor-cars in a train system. Fig. 2 is a simplified diagram of the system shown in Fig. 1 with certain parts and connections omitted in order to show more clearly the features constituting my present invention. Fig. 3 is a diagram illustrating the general construction of one of the circuit-controlling switches of the motor-controller. Fig. 4 is a diagram illustrating the positions of the auxiliary contacts on the reversing-switch cylinder in one of the operative positions of the said switch. Fig. 5 shows an application of the system to a train of cars.

Referring first to Fig. 1 of the drawings, $M'$ and $M^2$ represent the two motors of a motor equipment; C and RS, the circuit-controlling and reversing switches, respectively, of the motor-controller; F, a system of conductors through which the circuits of the actuating-windings for the several controller-switches are completed, and M M two master-switches the contacts of which are connected to the system of conductors F. The system, as shown in this figure, comprises such parts as are applicable to one of the motor-cars of a train system, and the system of conductors F is provided at each end with coupling devices $f$, by means of which connection may be made between corresponding conductors on the several cars of the train. The master-switches M are located one at each end of the system of conductors F, and this is the arrangement generally employed in railway systems in which it is desirable to have a master-switch at each end of each car. The master-switch at the right in Fig. 1 is shown in outline merely; but the corresponding switch at the left is shown diagrammatically with its contacts developed on a plane surface, as is customary in illustrating such constructions. Each of the master-switches comprises a controlling-switch A and a reversing-switch B. The motor-controller is of the separately-actuated-contact type and comprises electromagnetically-actuated circuit-controlling switches T' T' S P P and R' to R⁸, inclusive, and an electromagnetically-actuated reversing-switch, which, as shown in the drawings, consists of a rotatable cylinder on which the contacts for connecting the motor-windings for either direction of rotation are mounted, and two electromagnets D' and D², by means of which the reversing-switch is moved into one or the other of its operative positions. With the exception of the circuits which control the operation of the reversing-switch the general arrangement of the circuits in the operating system is the same as is shown in patent to Perry, No. 687,060, granted November 19, 1901, to which reference may be made for a detailed explanation of the various circuit connections. For the purposes of a general description it is sufficient to state that when any one of the master reversing-switches in the system has been moved into one or the other of its operative positions, so that the movable contacts 12ᵃ and 14ᵃ or the movable contacts 13ᵇ and 14ᵇ are in engagement with the corresponding fixed contacts 12' to 14', and when the corresponding controlling-switch has been moved into its first operative position, where the fixed contacts 1' to 11', inclusive, lie along the dotted line 1 1, circuits will be closed from a suitable source of supply through the contacts of the master-controller and the conductors of the operating system to the various actuating-windings which operate to move the reversing-switches of the motor-controllers into the position corresponding to the position of the reversing-switch of the master-controller (unless they already occupy such a position) and thereafter through the actuating-windings of those of the circuit-controlling switches of the motor-controllers which operate to connect the windings of the motors of each equipment in series with one another in a circuit containing a maximum resistance $r'$. A further movement of the controlling-switch of the master-controller up to and including the position marked 5 5 operates only to reduce and finally to short-circuit all of the resistances included in the motor-circuits. When the controlling-switch of the master-controller is moved from the position 5 5 to the position 6 6, the motor connections are changed from series to parallel, with a suitable resistance $r^2$ included in circuit therewith. Further movement of the controlling-switch of the master-controller through its subsequent positions operates to again reduce and to finally short-circuit the resistance in the motor-circuits, so that in the final position of the motor-controller switches the motors of each equipment will be connected in multiple, with no resistance in circuit therewith. The motor-controllers are therefore of the series-parallel type now commonly employed in railway-work. The operative parts of each of the circuit-controlling switches of the motor-controller are indicated in Fig. 1 by conventional diagrams, and a similar diagram on a larger scale is shown in Fig. 3. From an inspection of this latter figure it will be seen that each of the circuit-controlling switches comprises a fixed contact $d$, arranged to be engaged by a movable contact $c$, carried by a pivoted member $b$, which is operatively connected to the core of the solenoid $a$. The winding of the solenoid is connected in an operating-circuit leading through the system of conductors F to the particular master-controller from which the train system is for the time being controlled, and contacts $c$ and $d$ operate to close a circuit between conductors in the motor-circuit through a blow-out winding $e$, which is located adjacent to the contacts $c$ and $d$ in such a position that it will effectively disrupt any arc that may be formed between the same.

A suitable construction embodying the features above described is illustrated in the patent to Perry, No. 678,060.

My present invention relates to the circuit connections of the actuating system for operating the reversing and the circuit-controlling switches and has for one of its objects to so arrange the said connections that the operation of the circuit-controlling switches in all operative positions of the master-controller will be dependent upon the proper operation of the reversing-switch, so that until the motor-reversing switch occupies a position corresponding to the position of the master reversing-switch the circuit from the master-controller to the actuating-windings of those circuit-controlling contacts which control the supply of current to the motors will be open. At the same time my invention contemplates such an arrangement of the circuit connections that the actuating-windings of the circuit-controlling switches may be utilized in place of a dead resistance in circuit with the reversing-switch-actuating winding to reduce the current flowing therethrough after the reversing-switch has been actuated. The construction of the reversing-switch is such that there is considerable frictional resistance to its movement, and it therefore requires a much larger current to move it from one of its extreme positions to the other than it is desirable to maintain continuously flowing through the actuating-winding.

In prior motor-control systems with which I am familiar it has been customary to provide the reversing-switch cylinder with auxiliary contacts arranged either to open the circuit through the winding of the actuating-magnet after the reversing-switch has been operated or else to insert a current-limiting resistance in the circuit of the said winding after the reversing-switch has been operated. In the former case it is necessary to provide additional means for positively holding the reversing-switch in the position to which it has been thrown, and in the latter case energy is continuously wasted in a dead resistance. By my invention I am able to reduce the current flowing through the winding of the reversing-switch-actuating magnet after the reversing-switch has been moved into a desired position without introducing dead resistance into the circuit. I accomplish this result by so arranging the auxiliary contacts on the reversing-switch cylinder and by so connecting the actuating-windings of the reversing-switch and the circuit-controlling switches thereto that when the master-controller is in any one of its operative positions one of the reversing-switch-actuating windings will always be included either in circuit with the actuating-windings of the switches that make the series connection of the motor-circuits or in circuit with the actuating-windings of those switches which make the parallel connection. Moreover, the circuit connections of these actuating-windings are so connected to the contacts of the master-controller and to the auxiliary contacts on the reversing-switch cylinder that the motor-circuits cannot be closed in either the series or the parallel position of the master-controller until after the motor-reversing switch has been moved into the position corresponding to the position of the reversing-switch in the master-controller.

The particular parts of the system to which my present invention relates are shown in Fig. 2 separated from the rest of the system and occupying the same relative positions as the corresponding parts in the complete system, as illustrated in Fig. 1, the only difference being that the reversing-switch cylinder is shown developed on a plane surface and without the motor-reversing contacts mounted thereon. From an inspection of this figure it will be noted that the actuating-windings for the circuit-controlling switches are connected in two separate and distinct series. One of these series comprises the windings of the resistance-controlling switches $R^3$ to $R^8$, inclusive; but since the control-circuits for these windings have nothing to do with my present invention no further reference to them will be made. The other series includes the actuating-windings of the switches T' T', together with two distinct sets of windings branching therefrom, one branch including the actuating-windings of the switches R' and S and the other actuating-windings of the switches $R^2$, P, and P. Circuit connections from the ends of these branches are led to the master-controller contacts 4' 5' through conductors 4'' 5'' and conductors 4 and 5 of the main system of conductors F. In a series position of the master-controller the contact 4' is connected to ground, and in the parallel position of the master-controller the contact 4' is left on open circuit and the contact 5' is connected to the ground. At the other end of the series of windings connection is made to a conductor 18, which leads to an auxiliary contact on the reversing-switch cylinder. The reversing-switch-actuating windings D' and $D^2$ are connected at one end through conductors 12'' and 13'' and conductors 12 and 13 of the system of conductors F to the master-controller, and at the other end these windings are connected to auxiliary contacts operatively related to the reversing-switch, these contacts being so constructed and arranged that in one of the operative positions of the reversing-switch a circuit will be completed through one of the reversing-switch-actuating windings directly to ground through one of the conductors 17 and 20, and after the reversing-switch has been moved by means of the said actuating-winding into its other operative position the circuit to ground will be opened and the circuit of the reversing-switch-actuating winding completed through the conductor 18 and the actuating-windings of the circuit-controlling switches connected thereto.

Supposing the parts to be in the positions illustrated in Fig. 2 and supposing the switch A of the master-controller to be moved into its first operative position, a circuit may be traced from the trolley-conductor T through fixed contacts 1' and 2' and the coöperating movable contacts $1^a$ and $2^a$ to the member $b$ of the master reversing-switch B (this switch being shown in this figure as a simple lever-switch) to the contact 13' and thence through conductor 13 of the system of conductors F to a conductor 13'', which leads to one end of the actuating-winding of the electromagnet $D^2$, the other end of the said winding being connected (with the reversing-switch in the position shown in Fig. 2) through contacts 16' and 17' and the coöperating movable contact $16^a$ and $17^a$ to conductor 17 and thence to ground. This connection permits a current at the full potential of the source of supply to flow through the actuating-winding of the electromagnet $D^2$, and the said electromagnet will draw in its core and will move the reversing-switch cylinder into its other extreme position, so as to reverse the relative connections between the armature and field windings in the motor-circuits. The relative positions of the auxiliary contacts of the reversing-switch in this other extreme position are illustrated in Fig. 4, and from an inspection of this figure it will be seen that the reversing-switch in moving from one position to the other first breaks the connection between the winding of the magnet $D^2$ and the ground-conductor 17 and immediately thereafter completes a circuit through fixed contacts 16' and 18' and the coöperating movable contact $18^a$ to conductor 18, which leads to the actuating-windings of the two trolley-switches T' T' of the motor-controller. After passing through these windings the circuit divides, one branch leading through the actuating-windings of the switches R' and S to the conductor 4 and the other leading through the actuating-windings of the switches R² P P to the conductor 5. Since, however, the controlling-switch of the master-controller is in its first operative position, no circuit can exist through the conductor 5, and therefore the only path through which current can flow is through the conductor 4 to the contact 4' and thence through movable contacts 3ª and 4ª and fixed contact 3' to a ground connection. If the reversing-switch of the master-controller had been in its other operative position, as indicated in dotted lines in Fig. 2, then the circuit from the trolley-conductor would have been traced through the conductor 12 of the system of conductors F and thence through conductor 12'' and the actuating-winding of the electromagnet D' to fixed contact 19' and thence through movable contact 18ª and fixed contact 18' to the same conductor 18 as before. It will therefore be apparent that when the controlling-switch of the master-controller is moved into its first operative position the reversing-switch of the motor-controller will be first moved into a position corresponding to the position of the reversing-switch of the master-controller (unless it occupies such a position already) and that thereafter the circuit through the winding of the electromagnet which actuates the reversing-switch will be completed through the actuating-windings of those control-switches which operate to close the motor-circuits for the first series position. Such an arrangement of the actuating-circuits renders it feasible to permit a current of large volume to flow through the winding of the reversing-switch-actuating magnet to actuate the same, since as soon as the switch is thrown this current will be reduced (to an amount which may be no more than sufficient to maintain the reversing-switch in the position into which it has been thrown) by the inclusion in the circuit of the actuating-windings of those switches which operate to close the motor-circuits for the first series position. As already explained, the movement of the master-controlling switch through its succeeding positions up to the position 5 5 operates only to reduce and finally to short-circuit all of the resistance in the motor-circuits. When, however, the position 6 6 is reached, the conductor 5 in the system of conductors F is connected to ground through contacts on the master-controlling switches in place of the conductor 4. The actuating-windings of the switches R' and S are therefore cut out of circuit and in their place the actuating-windings of the switches R², P, and P are included, these switches operating to complete the parallel connection of the motors through a resistance $r^2$, which is smaller but of larger carrying capacity than the resistance $r'$. The arrangement of circuits as above described is particularly advantageous in a train system, for the reason that the circuit from the trolley-conductor through one of the reversing-switch-actuating windings and through the actuating-windings of the circuit-controlling switches which make either the series or the parallel connection of the motor-circuits to ground is not completed unless the motor-reversing switch occupies a position corresponding to the position into which the reversing-switch of the master-controller has been moved. If, therefore, the motor-reversing switch on any one of the cars of the train fails to throw when the circuit through the winding of the electromagnet which is in operative position is completed, then the current from the operating system will continue to flow only through this winding, and the circuits of the motors on that particular car will not be closed, and so far as the operation of the system is concerned that car will be virtually cut out or dead.

The motor-control system which I have illustrated in my present application employs a controller in which each of the circuit-controlling switches is electromagnetically actuated and in which the movable contacts of the reversing-switch are mounted on a common support. It is evident, however, that the reversing-switch contacts may be separately actuated in the same manner as the circuit-controlling contacts and that the contacts of those circuit-controlling switches which operate to connect the motor-windings in series and in parallel need not be separately actuated. Also I have shown and described electromagnets which directly actuate the several switches to which they are connected; but evidently so far as my invention is concerned the electromagnets may be arranged to actuate the corresponding switches either directly or indirectly. I therefore desire it to be understood that my invention is not limited to the specific constructions and arrangements shown and described, and in the claims hereto appended I aim to cover any motor-control system which embodies the essential features of my invention.

What I claim as new, and desire to secure by Letters Patent of the United States, is—

1. In a motor-controller comprising circuit-controlling and reversing switches, electromagnets for actuating said switches, a master-controller constructed and arranged to supply current to energize said electromagnets, and auxiliary contacts operatively related to the reversing-switch arranged to complete the circuit of the reversing-switch-actuating magnet through the actuating-windings of certain of the circuit-controlling switches after the reversing-switch has been operated.

2. In a controller comprising electromagnetically-actuated circuit-controlling switches and a separate reversing-switch, a plurality of electromagnets for actuating said latter switch, means for closing a circuit through the winding of one or the other of the reversing-switch-actuating magnets, and auxiliary contacts operatively related to the reversing-switch arranged to include the windings of certain of the electromagnets which operate circuit-controlling switches in said circuit after the reversing-switch has been operated.

3. In combination, one or more circuit-controlling switches, a separate reversing-switch, electromagnets for actuating said switches, means for closing an actuating-circuit through the winding of one or the other of the reversing-switch-actuating magnets, and means operatively connected to the reversing-switch for including the winding of a circuit-controlling switch-actuating magnet in said circuit after the reversing-switch has been operated.

4. In combination, one or more circuit-controlling switches, a separate reversing-switch, electromagnets for actuating said switches, means for closing a circuit for energizing a reversing-switch-actuating magnet, and means operatively related to the reversing-switch for including in said circuit one or more of the magnets which actuates circuit-controlling switches after the said reversing-switch has been operated.

5. In combination, circuit-controlling contacts, electromagnetic means for actuating said contacts, reversing-contacts, separate electromagnetic means for actuating said reversing-contacts, means for closing a circuit for energizing the electromagnetic means which actuates the reversing-contacts and means operatively related to the reversing-contacts constructed and arranged to include in said energizing-circuit the electromagnetic means for actuating the circuit-controlling contacts.

6. In combination, circuit-controlling contacts, electromagnetic means for operating said contacts, reversing-contacts, separate electromagnetic means for operating said reversing-contacts, a master-controller constructed and arranged to close a circuit for energizing the electromagnetic means which operates the reversing-contacts, and auxiliary contacts operatively related to the reversing-contacts constructed and arranged to include the electromagnetic means for actuating the circuit-controlling contacts in said energizing-circuit after the reversing-contacts have been operated.

7. In combination, a motor-controller comprising circuit-controlling and direction-controlling contacts, electromagnets for operating said contacts, a master-controller constructed and arranged to close a circuit through an electromagnet for operating the direction-controlling contacts, and means whereby the said electromagnet in operating includes in circuit with its own winding the windings of the electromagnets which operate certain of the circuit-controlling contacts.

8. In combination, a motor-controller comprising a reversing-switch and circuit-controlling switches, electromagnetic means for operating said switches, means for closing a circuit through the winding of the reversing-switch-actuating means, and means operated by the reversing-switch for including the actuating-windings of certain of the circuit-controlling switches in circuit with the winding of the reversing-switch-actuating means after the switch has been operated.

9. In combination, a motor-controller comprising electromagnetically-actuating circuit controlling and reversing switches, a master-switch for controlling the connection between a suitable source of supply and the switch-actuating magnets, and auxiliary contacts operatively connected to the reversing-switch constructed and arranged to complete the circuit of the reversing-switch-actuating magnet directly to the other side of the source of supply before the switch has been operated, and through the actuating-windings of certain of the circuit-controlling switches after the switch has been operated.

10. In a motor-control system a plurality of circuit-controlling switches, a separate reversing-switch, actuating-windings for the circuit-controlling switches connected in a series branching at one end to include two distinct sets of windings, separate actuating-windings for the reversing-switch, a master-controller having its contacts arranged to connect one end of one of the reversing-switch-actuating windings to one side of a source of current-supply and one of the branching ends of the series of windings which operate the circuit-controlling contacts to the other side of said source, and auxiliary contacts operatively related to the reversing-switch arranged to connect the other end of the reversing-switch-actuating winding directly to the other side of the source of supply until the reversing-switch has been actuated, and thereafter to connect the said end of the reversing-switch-actuating winding to the common end of the branching series of windings which operate the circuit-controlling switches.

11. In a motor-control system, reversing-contacts, contacts for connecting the motor-windings in series and in parallel, electrically-operated means for actuating said contacts, suitable circuit connections therefor, and a master-controller constructed and arranged to close at will a single circuit including the means for operating the reversing-contacts in either direction and the means for operating either the series or the parallel contacts.

12. In a motor-control system, reversing-contacts, contacts for connecting the motor-windings in series and in parallel, electrically-operated means for actuating said contacts, suitable circuit connections therefor, a master-controller constructed and arranged to close at will a single circuit including the means for operating the reversing-contacts in either direction and the means for operating either the series or the parallel contacts, and means for preventing the completion of the actuating-circuit for operating either the series or the parallel contacts until the reversing-contacts have responded to their operating means.

13. In a motor-control system, electrically-operating reversing and series-parallel contacts, a control system therefor comprising a plurality of conductors and a master-controller for closing a circuit through either one of two conductors for operating the reversing-contacts, and means comprising contacts operating with the reversing-contacts and other contacts in the master-controller for completing the said circuit through either one of two conductors which control the operation of the series and the parallel contacts.

14. In a motor-control system, two sets of contacts, electromagnetic means for actuating said contacts, a master-controller constructed and arranged to close an energizing-circuit through the electromagnetic means for actuating one set of contacts and means operatively related thereto for completing the said energizing-circuit through the electromagnetic actuating means for the other set of contacts after the first set of contacts has been operated.

In witness whereof I have hereunto set my hand this 30th day of December, 1901.

WILLIAM O. MUNDY.

Witnesses:
BENJAMIN B. HULL,
CHARLES STEINER.